United States Patent
Fujiwaka (10) Patent No.: US 9,495,061 B2
(45) Date of Patent: Nov. 15, 2016

(54) INFORMATION PROCESSING TERMINAL AND CONTROL METHOD THEREOF

(75) Inventor: Masaya Fujiwaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 298 days.

(21) Appl. No.: 13/643,675

(22) PCT Filed: Feb. 15, 2011

(86) PCT No.: PCT/JP2011/053135
§ 371 (c)(1),
(2), (4) Date: Oct. 26, 2012

(87) PCT Pub. No.: WO2011/135894
PCT Pub. Date: Nov. 3, 2011

(65) Prior Publication Data
US 2013/0038636 A1    Feb. 14, 2013

(30) Foreign Application Priority Data
Apr. 27, 2010   (JP) .................... 2010-102251

(51) Int. Cl.
G09G 5/12         (2006.01)
G06F 3/0481       (2013.01)
(Continued)

(52) U.S. Cl.
CPC ........... G06F 3/0481 (2013.01); G06F 1/1643 (2013.01); G06F 1/1647 (2013.01); G06F 1/1692 (2013.01); G06F 3/04883 (2013.01); G06F 3/1431 (2013.01); H04M 2250/16 (2013.01)

(58) Field of Classification Search
CPC .......... G06F 3/04; G06F 3/041; G06F 3/048; H04W 88/02; G09G 3/04; G09G 5/00; G09G 5/12

USPC .......... 345/33; 455/566; 715/702, 766, 769, 715/779, 815, 835–838
See application file for complete search history.

(56) References Cited

U.S. PATENT DOCUMENTS

2004/0066414 A1*  4/2004  Czerwinski et al. ......... 345/781
2007/0209022 A1*  9/2007  Gourdol et al. .............. 715/815
(Continued)

FOREIGN PATENT DOCUMENTS

CN    1750546 A    3/2006
CN    1941982 A    4/2007
(Continued)

OTHER PUBLICATIONS

Extended European Search Report, dated May 2, 2014, issued by the European Patent Office, in counterpart Application No. 11774679.2.
(Continued)

Primary Examiner — Priyank Shah
Assistant Examiner — Johny Lau
(74) Attorney, Agent, or Firm — Sughrue Mion, PLLC (57) ABSTRACT

An information processing terminal is provided with a first display and a second display and a control means that, when start-up of a first application has been instructed, displays the windows of each of the first application and a second application on the first display or the second display. The control means determines displays on which the windows of each of the first application and the second application are to be displayed based on the relation between the first application and the second application.

18 Claims, 8 Drawing Sheets

(51) Int. Cl.
 *G06F 1/16* (2006.01)
 *G06F 3/0488* (2013.01)
 *G06F 3/14* (2006.01)

(56) References Cited

U.S. PATENT DOCUMENTS

2010/0248788 A1* 9/2010 Yook et al. .................. 455/566
2010/0299597 A1* 11/2010 Shin et al. .................. 715/702

FOREIGN PATENT DOCUMENTS

| CN | 101606124 A | 12/2009 |
|---|---|---|
| JP | 10-097407 A | 4/1998 |
| JP | 10-198505 A | 7/1998 |
| JP | 2005-227951 A | 8/2005 |
| JP | 2009157537 A | 7/2009 |
| JP | 2010108331 A | 5/2010 |
| JP | 2011205576 A | 10/2011 |
| WO | 2010/023353 A1 | 3/2010 |

OTHER PUBLICATIONS

Communication dated Oct. 10, 2014 from the State Intellectual Property Office of the People's Republic of China in counterpart application No. 201180020884.1.

Communication dated Nov. 4, 2014 from the Japanese Patent Office in counterpart application No. 2012-512693.

* cited by examiner

INFORMATION PROCESSING TERMINAL AND CONTROL METHOD THEREOF

CROSS REFERENCE TO RELATED APPLICATIONS

This application is a National Stage of International Application No. PCT/JP2011/053135 filed Feb. 15, 2011, claiming priority based on Japanese Patent Application No. 2010-102251 filed Apr. 27, 2010, the contents of all of which are incorporated herein by reference in their entirety.

TECHNICAL FIELD

The present invention relates to an information processing terminal equipped with a plurality of displays.

BACKGROUND ART

Among information processing terminals such as mobile telephones, portable information terminals, and personal computers, there are some devices that are equipped with two displays. Among such information processing terminals, some have the capability of separately displaying each of a plurality of applications on a respective display (see Patent Document 1). When simultaneously starting up two applications, displaying each of the two application windows on a respective display is extremely convenient for the user when the two applications are used at the same time or are alternately used.

As a technique related to starting a plurality of applications on an information processing terminal, Patent Document 2 describes a portable information apparatus in which assigning a plurality of application programs as a set to a single icon allows a plurality of applications to be started up by simply selecting the icon.

Patent Document 3 describes an information processing device in which a plurality of applications are grouped based on the time differences between the times of selection of the plurality of applications. This information processing device enables the start-up of all applications that have been grouped by one operation.

Still further, Patent Document 3 describes the display of launch buttons of a plurality of applications that have been grouped near the icon of the group in the information processing device. Patent Document 3 also discloses that when any one launch button of a plurality of applications that have been grouped is selected, the launch buttons of the other applications of the group are displayed with emphasis.

LITERATURE OF THE PRIOR ART

Patent Documents

Patent Document 1: Japanese Unexamined Patent Application Publication No. H10-198505
Patent Document 2: Japanese Unexamined Patent Application Publication No. H10-97407
Patent Document 3: Japanese Unexamined Patent Application Publication No. 2005-227951

SUMMARY OF THE INVENTION

Problem to be Solved by the Invention

In an information processing terminal having a plurality of displays, operations for starting up and arranging a plurality of applications can be troublesome.

For example, in some cases, the user is required to carry out complicated operations for arranging the windows of a plurality of applications on desired displays. For example, the user is required to start one application, move the window of that application to the desired display, and then start the next application.

If the display is a touch panel, when an application has already started up on a display where an operation is to be carried out for starting up another application, the user is sometimes required to cancel display of the application that was started up earlier to return to a state that enables the operation for starting up an application in order to start up the next application.

When there is an application that displays a large window that ordinarily straddles a plurality of displays, the user is in some cases required to change the window by menu operations to display an application on only one display after starting up the application.

Regarding the start-up of a plurality of applications, the use of the technology of Patent Documents 2 and 3 mitigates the complexity of operations at the time of start-up of applications by placing a plurality of applications in association with each other and then starting the applications. However, despite the use of the technology of Patent Documents 2 and 3, it was not possible to arrange and display each application on an appropriate display. As a result, the user sometimes has to carry out separate operations for moving the windows of the plurality of applications that are started up to the desired displays.

It is an object of the present invention to provide an information processing terminal that is capable of appropriately arranging and starting up a plurality of applications on a plurality of displays without requiring the user to carry out complicated operations.

Means for Solving the Problem

The information processing terminal of the present invention for achieving the above-described object is provided with:
a first display and a second display; and
a control means that, when start-up of a first application has been instructed, displays the windows of each of the first application and a second application on the first display or the second display;
wherein the control means determines the displays on which the windows of each of the first application and the second application are to be displayed based on the relation between the first application and the second application.

The control method of the present invention is the control method of an information processing terminal that is provided with a first display and a second display and includes:
when start-up of a first application has been instructed, determining the displays on which the windows of each of the first application and a second application are to be displayed based on the relation between the first application and the second application; and
displaying the windows of the first application and the second application on respective displays that were determined.

BEST MODE FOR CARRYING OUT THE INVENTION

Modes for carrying out the present invention are next described with reference to the accompanying drawings.

First Exemplary Embodiment

Figure 1:
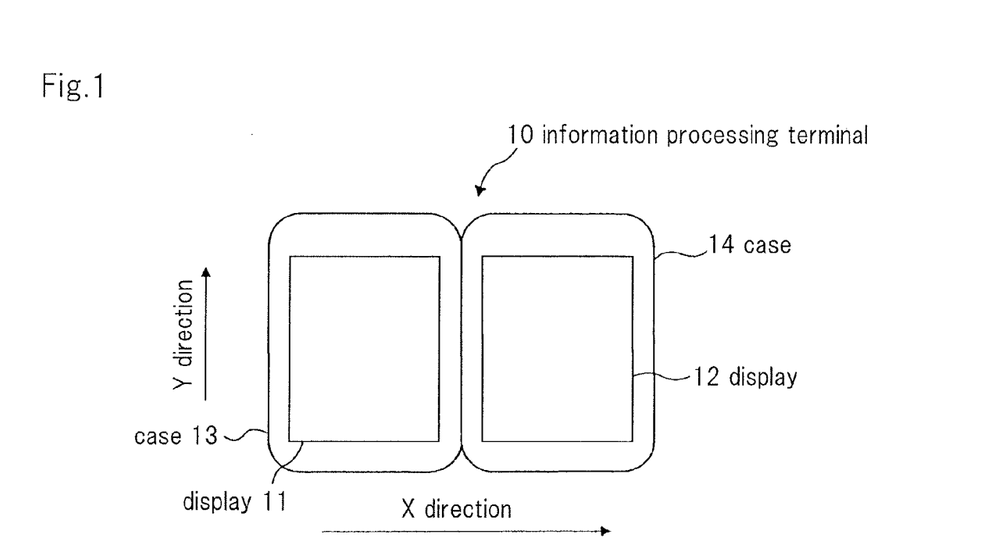
FIG. 1 is a front view of an information processing terminal according to the first exemplary embodiment.

FIG. 1 is a front view of the information processing terminal according to the first exemplary embodiment. Information processing terminal 10 of the exemplary embodiment of the present invention is, as an example, a portable information terminal provided with communication capabilities, and is made up of two cases 13 and 14 that are connected and that can be opened and closed, cases 13 and 14 each being provided with respective displays 11 and 12. The display surfaces of two displays 11 and 12 face in the same direction when case 13 and case 14 are in the opened state and are thus arranged so that both are simultaneously in the user's field of view. However, information processing terminal 10 that is provided with displays 11 and 12 on of two cases 13 and 14, respectively, need not be of an opening/closing form and may be of any other configuration. As another example, information processing terminal 10 may be of a sliding form in which two cases 13 and 14 are slidably connected together, or two cases 13 and 14 may be separable.

Figure 2:
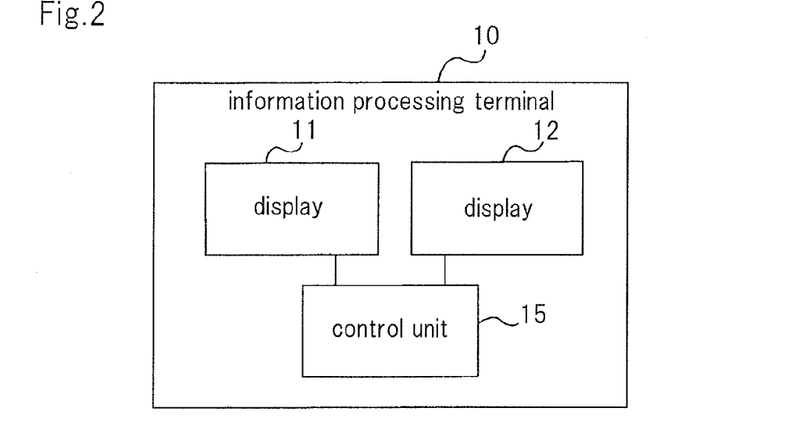
FIG. 2 is a block diagram showing the functional configuration of the information processing terminal according to the first exemplary embodiment.

FIG. 2 is a block diagram showing the functional configuration of the information processing terminal according to the first exemplary embodiment. Referring to FIG. 2, information processing terminal 10 includes displays 11 and 12 and control unit 15.

Displays 11 and 12 are touch panel display input devices that each have the function of displaying application windows and the function of detecting touch operations by using a pen or the user's fingers. Displays 11 and 12 in the first exemplary embodiment are assumed to handle multi-touch operations and can detect each touch made to each point among a plurality of points. Displays 11 and 12 communicate to control unit 15 touch input information that indicates positions that are touched.

Control unit 15 is a processing device that starts up various applications, displays windows of the started applications on displays 11 and 12, and further, executes the processing of the applications. Control unit 15 may include a CPU that serves to execute the various processes such applications and a GPU (Graphics Processing Unit) that carries out processes of displaying an image on displays 11 and 12.

Control unit 15 is further able to display the windows of two applications on respective display 11 and display 12 and simultaneously start up these two applications. At such times, control unit 15, based on the relative positional relation of the icons of the two applications, determines the displays on which each of the applications are to be displayed and starts each of the applications on the determined displays.

Figure 3:
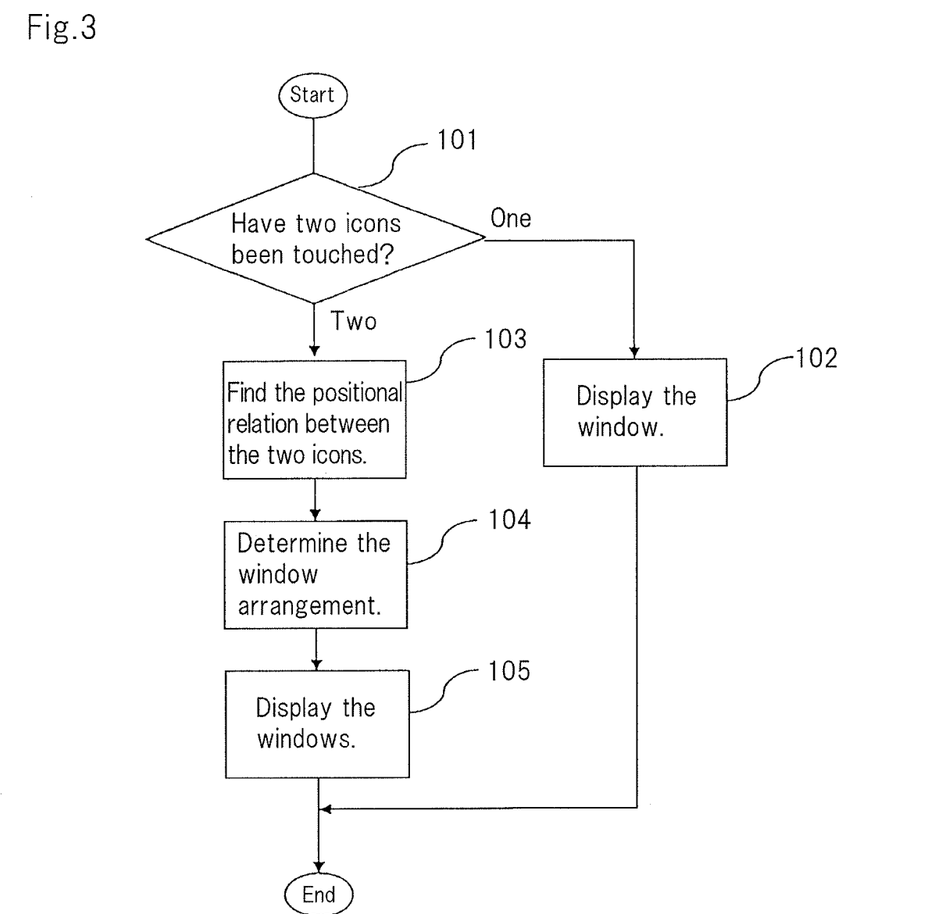
FIG. 3 is a flow chart showing the operations of control unit 15 when starting up an application in the first exemplary embodiment.
Figure 4A:
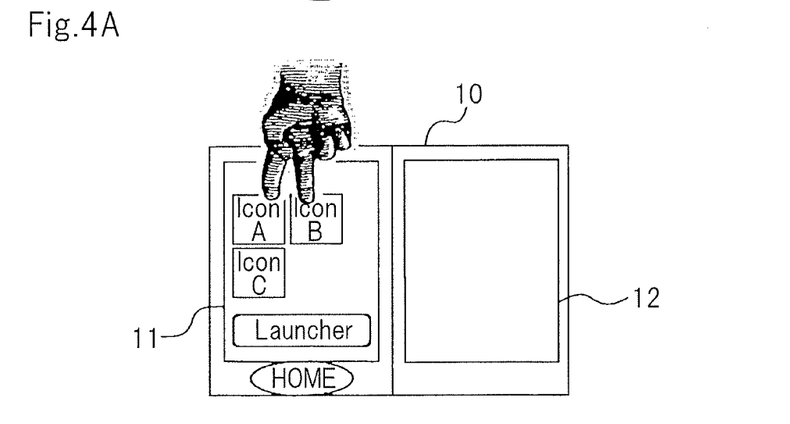
FIG. 4A shows one example of a state in which two applications are simultaneously started up.
Figure 4B:
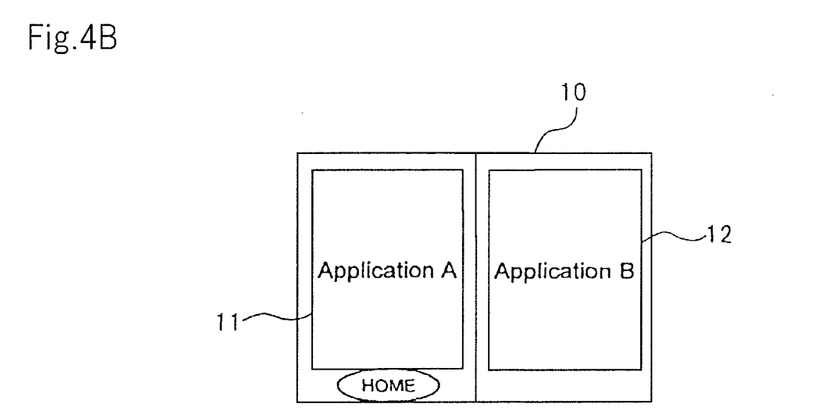
FIG. 4B shows an example of a state in which two applications are simultaneously started up.

FIG. 3 is a flow chart showing the operations of control unit 15 when starting up an application in the first exemplary embodiment. FIGS. 4A and 4B show examples of the state in which two applications are started up at the same time.

The icons of each of the applications are displayed on displays 11 and 12 before start-up of the applications. In the example of FIG. 4A, icons A-C of each of applications A-C, respectively, are displayed on display 11.

From this state, when the user touches a desired icon on display 11, touch input information is communicated from display 11 to control unit 15. When the touch input information has been reported, control unit 15 judges whether two icons have been touched or whether one icon has been touched based on the touch input information (Step 101).

If one icon has been touched, control unit 15 starts up the application of that icon (Step 102). The display on which the window of the application that is started up at this time is arbitrary. Control unit 15 may be set to, for example, fixedly display one of the displays, or, if there is an application that is already being executed, may determine the display on which to display the window of the new application depending on the relation with the application that is being executed.

If, in the judgment of Step 101, the touch input information indicates that two icons have been touched, control unit 15 finds the relative positional relation of the two icons that were touched in the direction in which display 11 and display 12 are aligned (in FIG. 1, the X direction, referred to as the "display alignment direction" hereinbelow) (Step 103).

In the example of FIG. 4A, icons A and B are touched at the same time, and control unit 15 therefore finds the relative positional relation of icons A and B in the display alignment direction. In the example of FIG. 4A, icon A is to the left and icon B is to the right in the display alignment direction.

Control unit 15 next determines the display on which to display each of applications A and B based on the relative positional relation of these two icons A and B (Step 104). In the example of FIG. 4A, icon A is on the left side and icon B is on the right side, and control unit 15 therefore determines to display the window of application A on left display 11 and display the window of application B on right display 12.

Based on this determination, control unit 15 starts up the two applications A and B such that the window of application A is displayed on display 11 and the window of application B is displayed on display 12 (Step 105).

When the relative positions in the display alignment direction of icon A and icon B coincide in Step 103 of FIG. 3, control unit 15 may further find the relative positional relation of icon A and icon B in the direction that is perpendicular to the display alignment direction (the Y direction in FIG. 1) and determine the displays for displaying the windows of applications A and B based on this positional relation.

For example, when using information processing terminal 10 with displays 11 and 12 aligned horizontally, as in FIGS. 4A and 4B, the application of the icon on the upper side may be displayed on the left display and the application of the icon on the lower side may be displayed on the right display. In the example of FIG. 4A, when icons A and C that are aligned vertically are touched, the window of application A of upper icon A is displayed on left display 11 and the window of application C of lower icon C is displayed on right display 12.

Figure 5A:
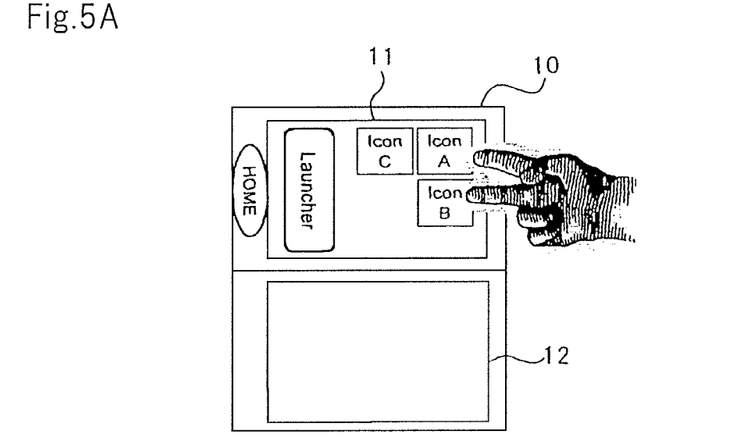
FIG. 5A shows another example of a state in which two applications are simultaneously started up.
Figure 5B:
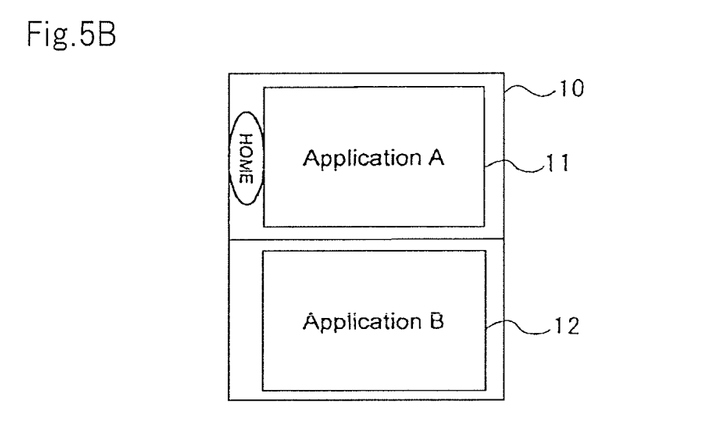
FIG. 5B shows another example of a state in which two applications are simultaneously started up.

FIGS. 5A and 5B show other examples of the state in which two applications are started up at the same time. In the example of FIGS. 5A and 5B, information processing terminal 10 is used with displays 11 and 12 aligned vertically.

When icons A and B that are aligned vertically are touched, as in FIG. 5A, control unit 15 displays the window of application A of icon A that is on the upper side in the display alignment direction on upper display 11 and displays the window of application B of icon B that is on the lower side on lower display 12.

In this case as well, when the relative positions of icon A and icon B in the display alignment direction coincide, control unit 15 may determine the displays on which the windows of applications A and B are to be displayed based on the relative positional relation of icon A and icon B in the direction that is perpendicular to the display alignment direction. For example, control unit 15 may display the application of the left icon on the upper display and display the application of the right icon on the lower display.

According to the present exemplary embodiment as described hereinabove, information processing terminal 10 determines the displays on which the windows of each of the applications are to be displayed based on the relation of two applications and is able to appropriately arrange and start up two applications on two displays 11 and 12 without requiring complicated operations by the user.

In addition, information processing terminal 10 displays icons that indicate each application on displays 11 and 12 and determines the displays on which the windows of each of the applications are to be displayed based on the relative positional relation of display of the icons of the applications that are to be started up. As a result, the user can be aware in advance of which display each of the applications is to be displayed on.

In addition, information processing terminal 10 determines the displays on which the windows of each of the applications are to be displayed such that the relative positional relation of display of the icons of the applications that are to be displayed matches the arrangement of the windows of each application. Accordingly, each application can be displayed in an arrangement that agrees with the user's natural sense.

In this example, the user provides instructions for two applications to start up by touching two icons at the same time without it is being necessary for these two applications to have been connected to each other in advance, but the present invention is not limited to this form. As another example, control unit 15 of information processing terminal 10 may place two applications in association in advance, whereby the designation of either of the applications by the user results in start-up of the application that was placed in association.

Second Exemplary Embodiment

The outer appearance of information processing terminal 10 of the second exemplary embodiment is identical to that shown in FIG. 1.

The functional configuration of information processing terminal 10 of the second exemplary embodiment is also similar to that shown in FIG. 2. However, in the second exemplary embodiment, displays 11 and 12 cannot handle a multi-touch operation can only detect one touch that is made to one point. The communication to control unit 15 of touch input information that indicates the position at which display 11 or 12 was touched is similar to that of the first exemplary embodiment, but touch input information that indicates a plurality of touched positions is not reported to control unit 15 at the same time.

Control unit 15 is able to display the windows of two applications on respective display 11 and display 12 and simultaneously start up the two applications, but the method of determining which application to display on each display is different from that of the first exemplary embodiment.

As the operation method in the present exemplary embodiment, the user drags one icon of two applications that are to be started at the same time and drops the icon such that the icon superposes the other icon. The only requirement is to make clear that one icon has been dragged and dropped on the other icon, even though the two icons are not stacked one upon the other at this time. The two icons may be aligned so as to be in contact with each other.

Control unit 15 determines which application to display on which display based on the relative positional relation of the two icons when one icon is dragged to the other icon, and starts up each of the applications on the displays that were determined.

Figure 6:
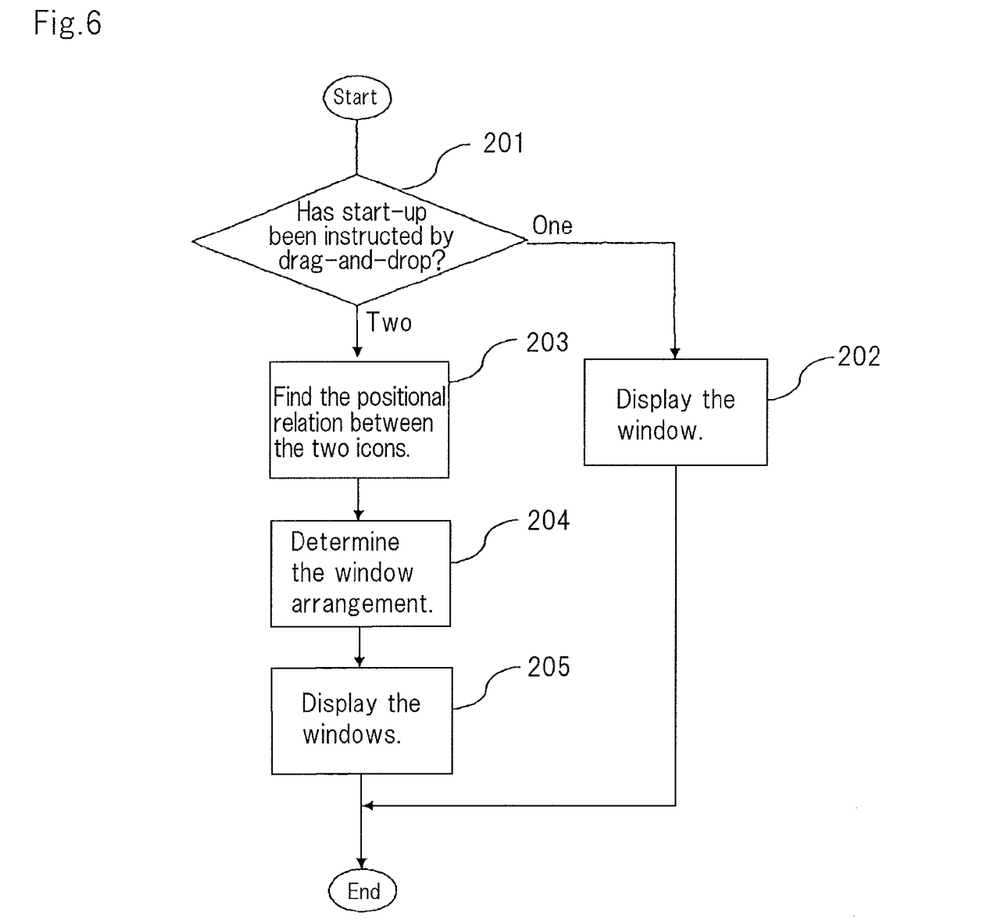
FIG. 6 is a flow chart showing the operations of control unit 15 when an application is started up in the second exemplary embodiment.
Figure 7A:
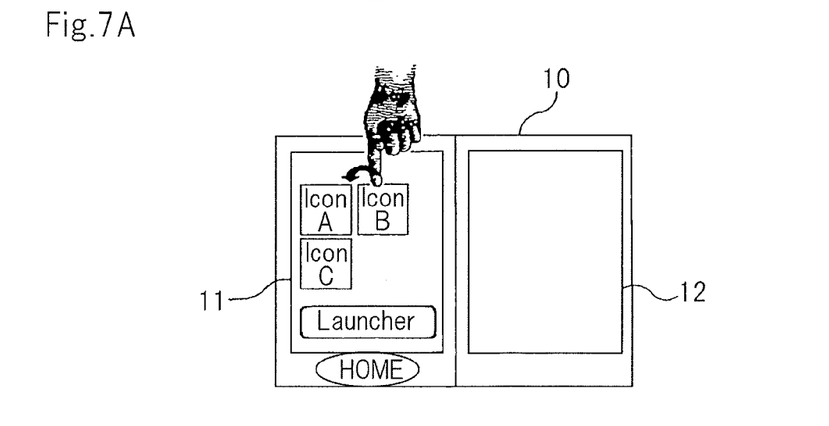
FIG. 7A shows an example of a state in which two applications are simultaneously started up.
Figure 7B:
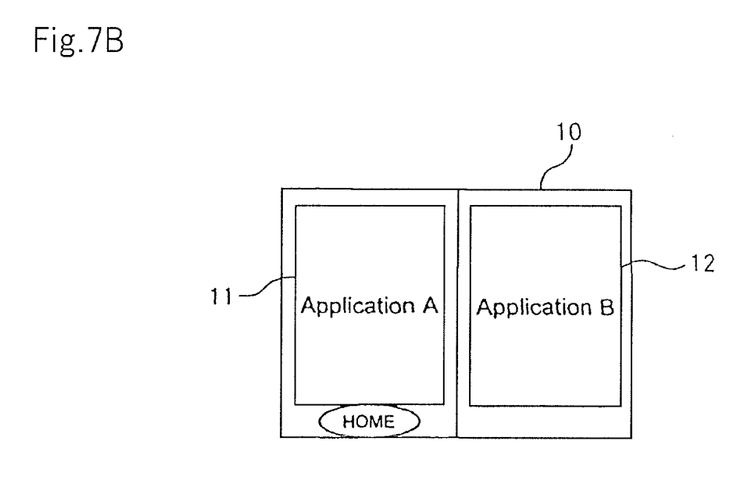
FIG. 7B shows an example of a state in which two applications are simultaneously started up.

FIG. 6 is a flow chart showing the operations of control unit 15 when starting up applications in the second exemplary embodiment. FIGS. 7A and 7B show examples of the state in which two applications are started up at the same time.

The icons of each of the applications are displayed on displays 11 and 12 before the applications are started up. In the example of FIG. 7A, icons A-C of each of applications A-C are displayed on display 11.

When the user touches display 11 to start up an application, touch input information that indicates the position that was touched is reported from display 11 to control unit 15.

Control unit 15 judges whether this operation is a start-up operation realized by a drag-and-drop action based on the touch input information that was reported (Step 201). By dragging a particular icon and dropping it on another icon, a user is able to instruct the start-up of the two applications.

If the operation is a start-up operation for starting up one application, control unit 15 starts up the instructed application (Step 202). The start-up operation for starting up one application is, for example, an operation of touching the icon of that application.

In the judgment of Step 201, if touch input information is a start-up command to start two applications by a drag-and-drop action, control unit 15 finds the relative positional relation in the display alignment direction of the two icons after dropping the icon (Step 203).

In the example of FIG. 7A, the user drags icon B and drops it over icon A, whereby control unit 15 finds the relative positional relation in the display alignment direction of icons A and B after dropping the icon. It is here assumed that icon A is to the left in the display alignment direction and icon B is to the right.

Control unit 15 next determines the displays on which the two applications are to be displayed based on the relative positional relation of the two icons after dropping the icon (Step 204). In the example of FIG. 7A, icon A is to the left and icon B is to the right, whereby control unit 15 determines to display the window of application A on left display 11 and display the window of application B on right display 12.

Based on this determination, control unit 15 starts up the two applications A and B such that the window of application A is displayed on display 11 and the window of application B is displayed on display 12 (Step 205).

When the relative positions in the display alignment direction of icon A and icon B coincide in Step 203 of FIG. 6, control unit 15 may further find the relative positional relation of icon A and icon B in the direction perpendicular to the display alignment direction and then determine the displays on which the windows of applications A and B are to be displayed based on this positional relation.

For example, when using information processing terminal 10 with displays 11 and 12 aligned horizontally as in FIGS. 7A and 7B, the application of the icon on the upper side in the Y direction may be displayed on the left display and the application of the icon on the lower side may be displayed on the right display.

As described hereinabove, according to the present exemplary embodiment, information processing terminal 10 determines the displays on which the windows of each of the applications are to be displayed based on the relative positional relation of two icons, whereby two applications can be started up in a desired arrangement on two displays 11 and 12 without requiring complicated operations by the user.

In the present exemplary embodiment, control unit 15 determines the displays on which the applications are to be started up based on the relative positional relation of two icons, but the present invention is not limited to this form. As another example, the displays on which the applications are to be started up may be determined depending on which icon was dropped on the other icon. For example, the application of the icon that was dropped may be displayed on right display 12 and the application of the other icon may be displayed on the left display. If icon B is dropped on icon A, application B will be displayed on right display 12 and application A will be displayed on display 11.

In the present exemplary embodiment, control unit 15 determines the displays on which the applications are to be started up based on the relative positional relation of two icons after dropping the icon, but the present invention is not limited to this form. As another example, the displays on which the applications are to be started up may be determined based on the relative positional relation of the two icons before dragging the icon. In this case, the displays on which application A and application B are displayed do not change regardless of whether icon A is dropped on icon B or icon B is dropped on icon A. The two applications can be displayed in a predetermined arrangement even if the user carries out the operation without paying attention to the dropping position.

In some cases, the applications stored in information processing terminal 10 may include an application having a full-display mode that displays a large window straddling two displays 11 and 12 and a single display mode that displays the window on either one of the displays. When two applications that include such an application are simultaneously started up, control unit 15 may start up the application having the full-display mode and single-display mode in the single-display mode. In this way, start-up can be realized in a state that allows parallel use of the two applications.

In the present exemplary embodiment, operations were carried out in which the user dropped the icon of one application on the icon of the other application such that the two applications that are started up simultaneously do not have to be placed in association in advance. However, the present invention is not limited to this form. The two applications may be placed in association in advance, and information processing terminal 10 may simultaneously start up the two applications when the user selects one of the applications. In this case, information processing terminal 10 may determine which application is to be displayed on which display based on the relative positional relation of the icons of the two applications.

Third Exemplary Embodiment

In the third exemplary embodiment, information processing terminal 10 saves information of relevance regarding two applications, and when the user selects a particular application, the application that was placed in association with that application is provided so that the user can select it. When the user further selects the offered application, information processing terminal 10 simultaneously starts up each of the two applications arranged on respective displays.

For example, as in the second exemplary embodiment, the user is assumed to designate two applications by dragging and dropping the icon of one of two applications on the icon of the other. Information processing terminal 10 determines which application is to be displayed on which display according to the positional relation of the two icons when the icon is dropped and starts up each of the applications on the displays that were determined.

Information processing terminal 10 further learns the degree of relevance of an application based on the user's past history of use and updates the information of the relevance. For example, relevance may be determined based on the relative time relation between at least one of the start-up timing or termination timing of one of the applications and at least one of the start-up timing and termination timing of the an other application in the past.

In addition, when providing an application that was placed in association with a particular application, information processing terminal 10 displays the icon of the relevant application in a size that accords with the degree of relevance.

The outer appearance of information processing terminal 10 according to the third exemplary embodiment is similar to that of the first exemplary embodiment shown in FIG. 1. In addition, the functional configuration of information processing terminal 10 according to the third exemplary embodiment is similar to that of the first exemplary embodiment shown in FIG. 2, but the operations of control unit 15 are different.

Figure 8:
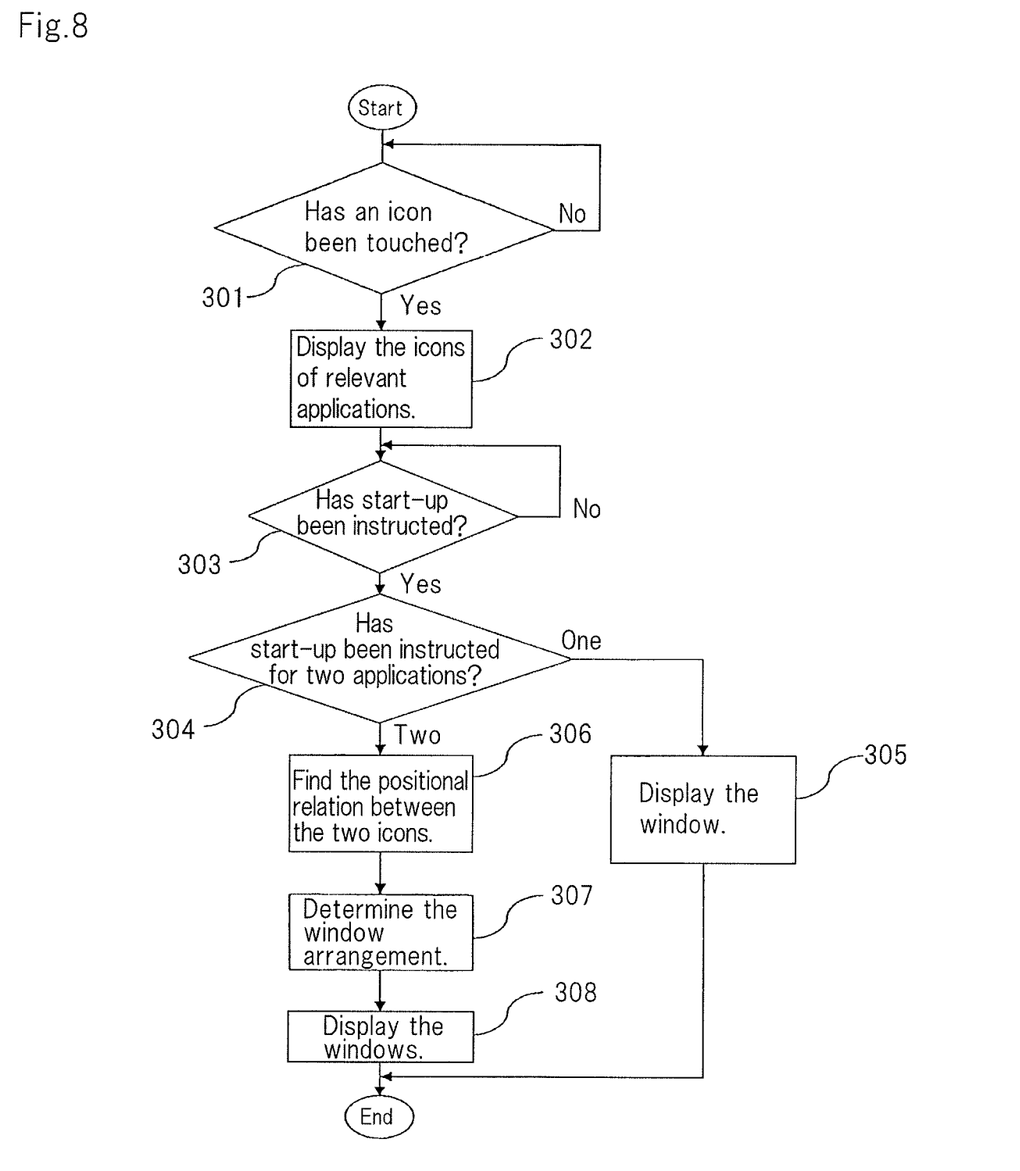
FIG. 8 is a flow chart showing the operations of control unit 15 when an application is started up in the third exemplary embodiment.
Figure 9A:
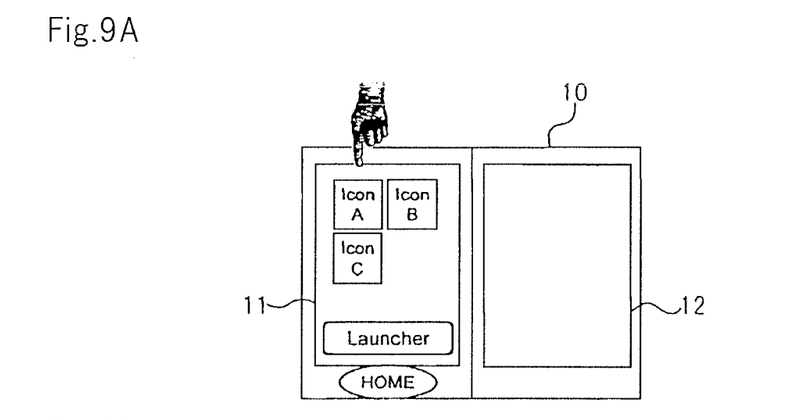
FIG. 9A shows an example of a state in which two applications are simultaneously started up.
Figure 9B:
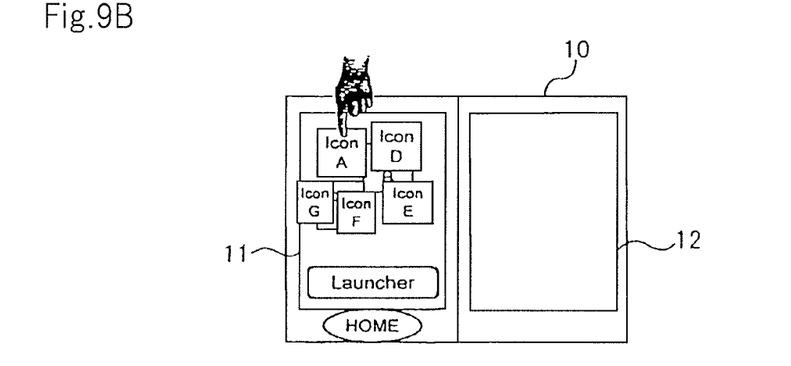
FIG. 9B shows an example of a state in which two applications are simultaneously started up.
Figure 9C:
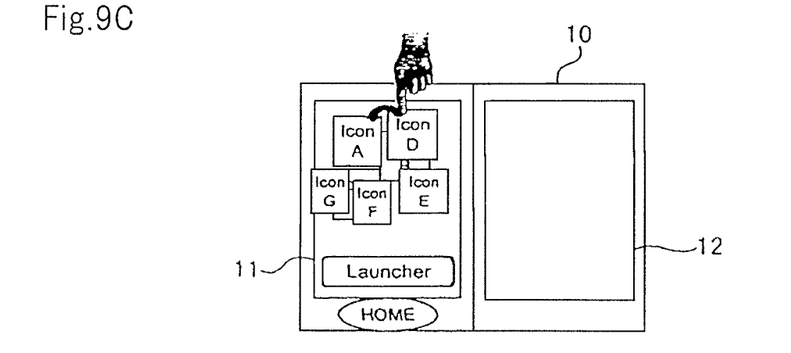
FIG. 9C shows an example of a state in which two applications are simultaneously started up.
Figure 9D:
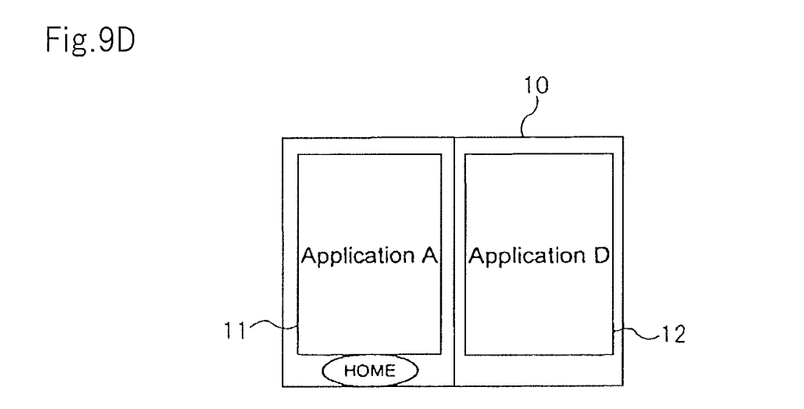
FIG. 9D shows an example of a state in which two applications are simultaneously started up.

FIG. 8 is a flow chart showing the operations of control unit 15 at the time of start-up of applications in the third exemplary embodiment. FIGS. 9A-9C show examples of the state in which two applications are started up at the same time.

The icons of each of the applications are displayed on displays 11 and 12 before the applications are started up. In the example of FIG. 9A, icons A-C of each of applications A-C are displayed on display 11. In addition, it is assumed that there are other applications D-G although their icons are not displayed in FIG. 9A. Control unit 15 saves relevance information that indicates the degree of relevance between the applications.

Referring to FIG. 8, control unit 15 monitors icons that have been touched based on the touch input information from display 11 (Step 301). Upon detecting that an icon has been touched, control unit 15 displays, as shown in FIG. 9B, in the vicinity of the touched icon the icons of applications (relevant applications) that have been placed in association with the application of that icon (the first selected application) (Step 302). At this time, control unit 15 displays the icons of relevant applications in sizes that accord with the degree of relevance with the first application that is indicated by the relevance information.

In the example of FIG. 9B, each of icons D, E, F, and G of applications D, E, F, and G that were placed in association with application A of icon A are displayed in the vicinity of icon A that was touched. In this example, it will be assumed that the degree of relevance is higher in the order of applications D, E, F, and G. As a result, icon D is the largest, icons E and F follow, and icon G is the smallest in FIG. 9B.

Control unit 15 next monitors operations instructing the start-up of applications based on the touch input information (Step 303). When an operation for instructing start-up of an application is carried out, control unit 15 judges whether this operation instructs the start-up of two applications (Step 304).

If the operation is a start-up operation for starting up one application (the first selected application), control unit 15 starts the application that was instructed (Step 305). No particular limitations apply to the operation of instructing start-up of the first selected application, but the operation may be to again touch the icon.

In the judgment of Step 304, if the touch input information is a start-up command for starting up two applications by means of a drag-and-drop action, control unit 15 finds the relative positional relation in the display alignment direction of the two icons after dropping the icon (Step 306). For example, it will be assumed that the operation of selecting any relevant application and dropping the icon of the selected relevant application (second selected application) on the icon of the first selected application is a command to activate the first selected application and the second selected application.

In the example of FIG. 9C, the user drags icon D and drops the icon on icon A, and control unit 15 therefore finds the relative positional relation in the display alignment direction of icons A and D after dropping the icon. In this case, icon A is to the left in the display alignment direction and icon D is to the right.

Control unit 15 next determines the displays on which the two applications are to be displayed based on the positional relation of the two icons that was found (Step 307). In this example, icon A is to the left and icon D is to the right, and control unit 15 therefore determines to display the window of application A on left display 11 and display the window of application D on right display 12.

Based on this determination, control unit 15 starts up the two applications A and D such that the window of application A is displayed on display 11 and the window of application D is displayed on display 12 (Step 308).

Figure 10:
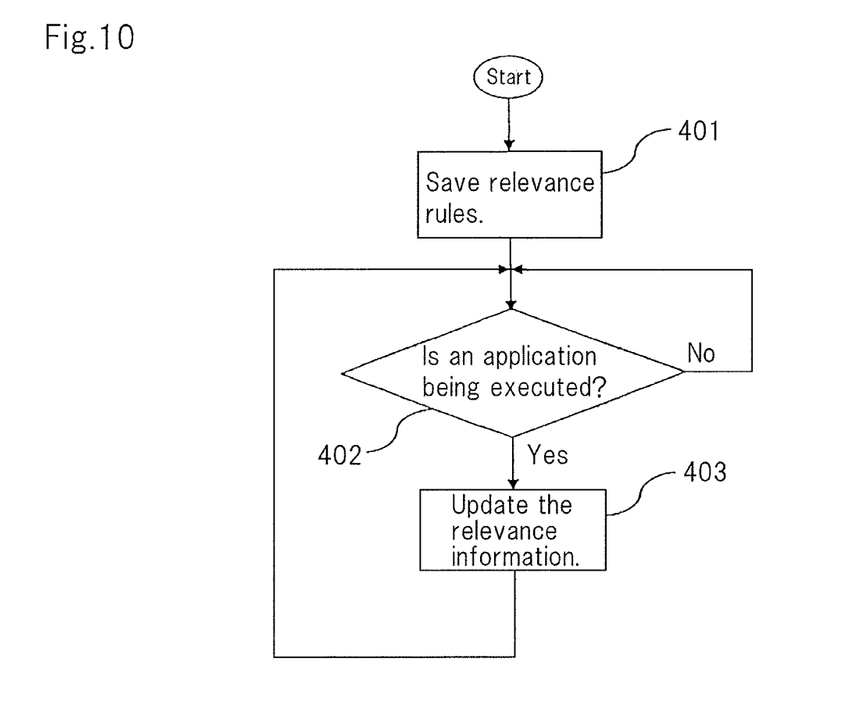
FIG. 10 is a flow chart showing the relevance learning operations of control unit 15 in the third exemplary embodiment.

FIG. 10 is a flow chart showing the relevance learning operation of control unit 15 in the third exemplary embodiment. Referring to FIG. 10, control unit 15 saves in advance the correspondence between relevance patterns and the points of these relevance patterns as relevance rules (Step 401).

The relevance patterns are application usage modes of two applications that are to be placed in association. Points prescribe the degree to which two applications that pertain to a relevance pattern are relevant.

As a first example of a relevance pattern, a usage mode is considered in which every time application A is started up on one display, application B is soon started up on the other display. This type of usage mode can be interpreted as a case in which applications A and B are basically applications that are used together. As a result, the points of this relevance pattern should be set relatively high. As a specific example, an accounting application such as a household accounts application and a calculator application would fit this relevance pattern.

As a second example of a relevance pattern, a usage mode can be considered in which application A is started up on one display and application B is started up on the other display after the passage of a fixed time interval, and application B is terminated either before or at a time close to application A. This usage mode can be interpreted as a case in which application B is used with a certain degree of frequency when application A is being executed but is not frequently used by itself. As a result, the points of this relevance pattern should not be set as high as for the first example, but should be set somewhat high. As a specific example, a browser application and a dictionary application would fit this relevance pattern. When a dictionary application is used to check words encountered in information while consulting information by a browser application, termination of the browser application makes the dictionary application superfluous.

As a third example of a relevance pattern, a usage mode can be considered in which application A is started up on one of the displays, application B is started up on the other display after the passage of a fixed time interval, and application B is used for at least a fixed time interval after application A is terminated. This type of usage mode can be interpreted as a case in which the use of application A provides a motive for starting up application B, but application B is also used separately, or a case in which application A serves as an application launcher for starting up application B. As a result, this relevance pattern can be considered as worthy for placing the two applications in association to increase convenience and a certain level of points of the relevance pattern should therefore be set, although not to the level of the first example and second example. As a specific example, a mailer application and a browser application would fit this relevance pattern. The browser application is started up when a user clicks on a URL (Uniform Resource Locator) that is included in e-mail that is displayed by the mailer application, and the browser application may often continue to be used despite the subsequent termination of the mailer application.

Returning to FIG. 10, control unit 15 monitors the execution of applications (Step 402), and together with the execution of applications, updates the degree of relevance among applications that is managed as relevance information in accordance with relevance rules (Step 403). As a specific example, when the usage mode between two applications pertains to a relevance pattern, control unit 15 may take the points of the relevance pattern as the degree of relevance between the two applications.

According to the present exemplary embodiment as described hereinabove, applications are placed in association with each other in advance, and when the icon of a particular application is selected by the user, the application that was placed in association with that application is presented to the user. As a result, upon starting up a particular application, the user is able to select and simultaneously start up the application that was placed in association with that application. In addition, even when a plurality of applications have been placed in association with a particular application, the user is able to select and start up desired applications from among these applications. Still further, because icons of applications that have been placed in association with a particular application are displayed in sizes that accord with their degree of relevance, the user can both see the degree of relevance and easily select applications having a high degree of relevance.

As a specific example in the present exemplary embodiment, an example was shown in which, when the usage mode of two applications pertains to a relevance pattern, control unit 15 takes the points of this relevance pattern as the degree of relevance between the two applications. However, the present invention is not limited to this form. As another example, when the usage mode of two applications pertains to a relevance pattern, control unit 15 may add the points of the relevance pattern to the degree of relevance between the two applications.

Although examples have been shown hereinabove as exemplary embodiments of the present invention in which the displays on which each of two applications are to be displayed are determined based on the relative positional relation between two icons or the time relation of the timing of start-up or termination, the present invention is not limited to these forms. The display on which each application is to be displayed may be determined based not on the positional relation of the icons but on any relation between the two applications. The display on which the window of each application is to be displayed is determined based on the relation between the two applications, and the two applications can therefore be started up arranged appropriately on two displays without requiring complicated operations by the user.

For example, when two applications were started up in the past, the displays on which the applications are to be displayed may be determined based on the arrangement relation of the application windows, which indicates which applications were used and displayed on which displays when the two applications were started up in the past.

Alternatively, the displays on which each of the applications are to be displayed may be determined based on the frequency of arrangement of past application windows. If the frequency at which application A was displayed on display A and application B was displayed on display B is higher than the frequency at which application A was displayed on display B and application B was displayed on display A when two applications A and B were started up in the past, control unit 15 may determine to display application A on display A and display application B on display B.

Alternatively, when two applications were started up previously, the displays on which the applications are to be displayed may be determined based on the arrangement relation of application windows, which indicates which applications were displayed on which displays when the two applications were previously started up.

Alternatively, a solution may be adopted by which the user can set the relation of the two applications for determining the displays on which the applications are to be displayed. When information that indicates the relation that was set by the user is saved, control unit 15 may refer to this information to determine the arrangement when two applications are to be displayed on two displays.

Still further, if two applications that are to be started up on two displays have been placed in association, it is not absolutely necessary that the two icons be simultaneously touched or that one icon be dropped on the other.

When two applications have been placed in association, information processing terminal 10 may save in advance information that indicates the combinations of applications that have been placed in association. By simply instructing the start-up of one application, information processing terminal 10 is then able to start up the application for which start-up was instructed and the application that was placed in association with that application without the user having to simultaneously touch two icons or drop one icon on the other icon. In this case as well, information processing terminal 10 may determine the displays on which the applications are to be started up based on the relation between the applications such as, for example, the relative positional relation between two icons, the time relation of the timings of past start-up or termination, the past arrangement relation of application windows such as frequency or the previous state, and the user's settings.

In this case, information processing terminal 10 may learn combinations of relevant applications based on past usage modes of applications. For example, when application A was displayed and used on one display in the past, if application B was displayed with the highest frequency on the other display, information processing terminal 10 should place the set of application A and application B in association with each other. Alternatively, if application C was displayed on the other display when application A was previously used displayed on one display, information processing terminal 10 should place the set of application A and application C in association with each other. The present invention is not limited to cases of establishing relevance by learning application after application. As another example, information processing terminal 10 may place one application in association with another application by a user's settings rather than by learning.

Although the above explanation regards exemplary embodiments of the present invention, the present invention is not limited to these exemplary embodiments, and within the scope of the technical idea of the present invention, these exemplary embodiments may be used in combination or portions of the configurations may be modified.

This application claims the benefits of priority based on Japanese Patent Application No. 2010-102251 for which application was submitted on Apr. 27, 2010 and incorporates by citation all of the disclosures of that application.

What is claimed is:

1. An information processing terminal comprising:
   a first display and a second display; and
   a control unit that individually receives touch information of a first icon that indicates a first application and a second icon that indicates a second application from at least one of said first and second displays, said first and second icons being separately displayed on at least one of said first and second displays, and that, when said first icon and said second icon are selected, causes display of windows of each of said first application and said second application on said first display or said second display, respectively;

wherein:

said control unit determines displays on which windows of each of said first application and said second application are to be displayed based on a relation between said first application and said second application;

said relation is a relative positional relation between the first icon that indicates said first application and the second icon that indicates said second application that are displayed on said first display or said second display; and said control unit determines displays on which windows of each of said first application and said second application are to be displayed based on said positional relation when start-up of said first application is instructed.

2. The information processing terminal as set forth in claim 1, wherein said control unit determines displays on which windows of each of said first application and said second application are to be displayed based on said positional relation when said first icon and said second icon were selected.

3. The information processing terminal as set forth in claim 1, wherein, when said first icon is dragged and dropped on said second icon, said control unit determine displays on which windows of each of said first application and said second application are to be displayed based on said positional relation before dragging said first icon.

4. The information processing terminal as set forth in claim 1, wherein, when said first icon is dragged and dropped on said second icon, said control unit determines displays on which windows of each of said first application and said second application are to be displayed based on said positional relation after dropping said first icon.

5. The information processing terminal as set forth in claim 1, wherein displays on which windows of each of said first application and said second application are to be displayed are determined to match the relative positional relation between said first icon and said second icon in the direction in which said first display and said second display are aligned.

6. The information processing terminal as set forth claim 1, further comprising a single-display mode in which said first application is displayed on either of said first display and said second display, and a two-display mode in which said first application is displayed straddling both said first display and said second display, wherein said control means unit, if determining displays on which windows of each of said first application and said second application are to be displayed based on said relation, starts up said first application in said single-display mode.

7. The information processing terminal as set forth in claim 1, wherein:

said second application is placed in association with said first application in advance; and said control unit, when the first icon that indicates said first application is selected, displays, in the vicinity of said first icon, the second icon that indicates said second application.

8. The information processing terminal as set forth in claim 7, wherein said control unit, when said first icon is selected, displays, in the vicinity of said first icon, a plurality of icons including said second icon that correspond to a plurality of relevant applications that have been placed in association with said first application.

9. The information processing terminal as set forth in claim 8, wherein said control unit displays each icon of said plurality of relevant applications in sizes that correspond to the degree of relevance to said first application of each of said plurality of relevant applications.

10. The information processing terminal as set forth in claim 9, wherein said control unit places said relevant applications in association with said first application based on the relative time relation between at least one of the start-up timing and termination timing of said first application and at least one of the start-up timing and termination timing of said relevant applications in the past.

11. The information processing terminal as set forth in claim 10, wherein said control unit sets correspondence between relevance patterns that are determined by said time relation and points that prescribe the degree to which applications that pertain to said relevance patterns are relevant and, based on said points, successively updates the degree of relevance between applications that fit said relevance pattern.

12. The information processing terminal as set forth in claim 11, wherein said control unit sets said correspondence for at least one relevance pattern of:

a first relevance pattern in which, each time said first application is started up, said relevant application is started up on a different display than that of said first application within a predetermined threshold time interval from the start-up of said first application, and moreover, the difference between termination times of said first application and said relevant application is within a predetermined time interval;

a second relevance pattern in which said relevant application is started up on a different display than that of said first application after the passage of a predetermined time interval from the start-up of said first application, and the termination time of said relevant application is before the termination time of said first application or is within a predetermined time interval from the termination time of said first application; and a third relevance pattern in which said relevant application is started up on a different display than that of said first application after the passage of a predetermined time interval from the start-up of said first application, and the termination time of said relevant application is after the passage of a predetermined time interval from the termination time of said first application.

13. The information processing terminal as set forth in claim 12, wherein the points of said first relevance pattern are higher than the points of said second relevance pattern, and the points of said second relevance pattern are higher than the points of said third relevance pattern.

14. The information processing terminal as set forth in claim 1, wherein said relation is determined by which display from among said first display and said second display said first application and said second application are displayed on when said first application and said second application were started up in the past.

15. The information processing terminal as set forth in claim 14, wherein said relation is determined by which display from among said first display and said second display said first application and said second application are displayed on with higher frequency.

16. The information processing terminal as set forth in claim 14,
wherein said relation is determined by which display from among said first display and said second display said first application and said second application are displayed on when said first application and said second application were previously started up.

17. The information processing terminal as set forth in claim 1, wherein said relation is set by a user's operation.

18. A control method of an information processing terminal that is provided with a first display and a second display, said control method comprising:
individually receiving touch information of a first icon that indicates a first application and a second icon that indicates a second application from at least one of said first and second displays, said first and second icons being separately displayed on at least one of said first and second displays, and that, when said first icon and said second icon are selected, determining display of windows of each of said first application and said second application based on the relation between said first application and said second application; and
causing display of windows of said first application and said second application on said respective displays that were determined;
said relation is a relative positional relation between the first icon that indicates said first application and the second icon that indicates said second application that are displayed on said first display or said second display; and
displays on which windows of each of said first application and said second application are to be displayed are determined based on said positional relation when start-up of said first application is instructed.

* * * * *